United States Patent
Hao et al.

(10) Patent No.: US 12,114,370 B2
(45) Date of Patent: Oct. 8, 2024

(54) DETERMINATION METHOD, ACCESS, TRANSMISSION, PROCESSING METHOD AND DEVICE, BASE STATION AND TERMINAL

(71) Applicant: ZTE Corporation, Guangdong (CN)

(72) Inventors: Peng Hao, Shenzhen (CN); Junfeng Zhang, Shenzhen (CN); Patrick Svedman, Chevy Chase, MD (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/513,802

(22) Filed: Nov. 20, 2023

(65) Prior Publication Data
US 2024/0098802 A1    Mar. 21, 2024

Related U.S. Application Data

(63) Continuation of application No. 17/229,431, filed on Apr. 13, 2021, now Pat. No. 11,844,112, which is a
(Continued)

(30) Foreign Application Priority Data

Nov. 4, 2016 (CN) .......................... 201610982012.8

(51) Int. Cl.
*H04W 74/0833* (2024.01)
*H04B 7/06* (2006.01)

(52) U.S. Cl.
CPC ........ *H04W 74/0833* (2013.01); *H04B 7/063* (2013.01); *H04B 7/0632* (2013.01); *H04B 7/0639* (2013.01)

(58) Field of Classification Search
CPC ........... H04W 74/0833; H04W 72/046; H04W 74/004; H04W 74/0866; H04B 7/063; H04B 7/0632; H04B 7/0639
See application file for complete search history.

(56) References Cited

U.S. PATENT DOCUMENTS

| 8,693,412 B2 | 4/2014 | Jarni et al. |
| 2008/0267134 A1 | 10/2008 | Cheng et al. |

(Continued)

FOREIGN PATENT DOCUMENTS

| CN | 101005308 B | 7/2007 |
| CN | 101286753 A | 10/2008 |

(Continued)

OTHER PUBLICATIONS

A. Ghosh et al.: "Random Access Design for UMTS Air-Interface Evolution" IEEE VTC Proceedings, IEEE, US; Apr. 1, 2007 (5 pages).
(Continued)

*Primary Examiner* — Hashim S Bhatti
(74) *Attorney, Agent, or Firm* — Foley & Lardner LLP

(57) ABSTRACT

Disclosed is a determination, access, sending and processing method and device, base station and terminal. The method for determining au uplink receiving beam and applied to a base station includes: receiving, by using N receiving configurations, a random access signal sent by a terminal, where N is an integer equal to or greater than 2; obtaining respective receiving state information corresponding to the N receiving configurations; and determining a receiving configuration of the uplink receiving beam according to the receiving state information.

20 Claims, 9 Drawing Sheets

Related U.S. Application Data continuation of application No. 16/401,492, filed on May 2, 2019, now Pat. No. 10,993,267, which is a continuation of application No. PCT/CN2017/109117, filed on Nov. 2, 2017.

(56) References Cited

U.S. PATENT DOCUMENTS

| | | |
|---|---|---|
| 2009/0067540 A1 | 3/2009 | Lee et al. |
| 2010/0054235 A1 | 3/2010 | Kwon et al. |
| 2010/0067497 A1 | 3/2010 | Chmiel et al. |
| 2011/0110240 A1 | 5/2011 | Bergquist et al. |
| 2011/0235529 A1 | 9/2011 | Zetterberg et al. |
| 2011/0268049 A1 | 11/2011 | Luo et al. |
| 2012/0099532 A1 | 4/2012 | Lee et al. |
| 2013/0039324 A1 | 2/2013 | Kwon et al. |
| 2013/0044657 A1 | 2/2013 | Oh et al. |
| 2013/0072244 A1 | 3/2013 | Jeong et al. |
| 2013/0215852 A1 | 8/2013 | Noh et al. |
| 2013/0272220 A1 | 10/2013 | Li et al. |
| 2014/0169303 A1 | 6/2014 | Jami et al. |
| 2015/0023329 A1 | 1/2015 | Jiang et al. |
| 2015/0124716 A1 | 5/2015 | Li et al. |
| 2015/0359007 A1 | 12/2015 | Liu et al. |
| 2015/0365975 A1 | 12/2015 | Sahlin et al. |
| 2016/0105884 A1 | 4/2016 | Li et al. |
| 2017/0265230 A1 | 9/2017 | Liu et al. |
| 2018/0041949 A1 | 2/2018 | Liu et al. |
| 2018/0070403 A1 | 3/2018 | Uemura et al. |
| 2018/0279364 A1 | 9/2018 | Hui et al. |
| 2018/0295648 A1 | 10/2018 | Chen et al. |
| 2018/0310324 A1 | 10/2018 | Ibars Casas et al. |
| 2019/0044782 A1 | 2/2019 | Zeng et al. |
| 2019/0123864 A1 | 4/2019 | Zhang et al. |
| 2019/0239123 A1* | 8/2019 | Kim ............ H04W 80/08 |
| 2019/0254078 A1* | 8/2019 | Zhang ............ H04W 72/0453 |
| 2020/0112413 A1 | 4/2020 | Lin et al. |

FOREIGN PATENT DOCUMENTS

| | | |
|---|---|---|
| CN | 101431803 A | 5/2009 |
| CN | 101507347 A | 8/2009 |
| CN | 101911541 A | 12/2010 |
| CN | 105474725 A | 4/2016 |
| WO | WO-2011/046377 A2 | 4/2011 |
| WO | WO-2015/144256 A1 | 10/2015 |

OTHER PUBLICATIONS

Ericsson, "Analysis of Random Access requirements in NB-Iot", 3GPP TSG RAN WG4 Meeting #78bis, R4-161946, Apr. 15, 2016, San Jose del Cabo, Mexico (5 pages).

Extended European Search Report for EP Appl. No. 17866437.1, dated Dec. 14, 2021 (5 pages).

Extended European Search Report on EP 17866437.1 dated Apr. 23, 2020 (11 pages).

Final Office Action on U.S. Appl. No. 17/229,431 DTD Jan. 17, 2023.

First Chinese Office on CN Patent Appln. No. 201610982012.8, dated Mar. 8, 2023 (17 pages, including English translation).

G. Ku et al., "Resource Allocation and Link Adaptation in LTE and LTE Advanced: A Tutorial", IEEE Communications Surveys & Tutorials, Jul. 1, 2015, vol. 17, Issue 3, pp. 1605-1633. https://doi.org/10.1109/COMST.2014.2383691.

Huang et al., "Research on Physical Random Access Channel Preamble Detection Based on LTE", Microprocessors, Oct. 2013, College of Internet of Things Engineering,Hohai University,Changzhou 213022,China (4 pages).

International Search Report and Written Opinion for International Appl. No. PCT/CN2017/109117, mailed on Feb. 2, 2018.

Non-Final Office Action on U.S. Appl. No. 16/401,492 DTD Jul. 9, 2020.

Non-Final Office Action on U.S. Appl. No. 17/229,431 DTD May 4, 2023.

Non-Final Office Action on U.S. Appl. No. 17/229,431 DTD Aug. 30, 2022.

Notice of Allowance on U.S. Appl. No. 16/401,492 DTD Feb. 24, 2021.

Notice of Allowance on U.S. Appl. No. 17/229,431 DTD Aug. 16, 2023.

Texas Instruments Inc., "Non Synchronized Random Access Procedure in E-UTRA", 3GPP TSG RAN WG1 #47, R1-063212, Nov. 10, 2006, Riga, Latvia (5 pages).

X. Li et al., "Design and performance of the random access preamble structure for LTE-A super long-range coverage", Journal of Xidian University, Oct. 1, 2013, 40. 38-43 156.10.3969/j.issn.1001-2400.2013.05.007.

Zhang et al., "Implementation of Random Access Test Case in LTE System on Conformance Testing Platform", Radio Communications Technology, 42(3), Chongqing University of Posts and Telecommunications, Chongqing 400065, China (4 pages).

\* cited by examiner

DETERMINATION METHOD, ACCESS, TRANSMISSION, PROCESSING METHOD AND DEVICE, BASE STATION AND TERMINAL

CROSS REFERENCE TO RELATED APPLICATIONS

The present U.S. Utility patent application claims priority pursuant to 35 U.S.C. § 120 as a continuation of U.S. Utility application Ser. No. 17/229,431, entitled "DETERMINATION METHOD, ACCESS, TRANSMISSION, PROCESSING METHOD AND DEVICE, BASE STATION AND TERMINAL", filed Apr. 13, 2021, which is a continuation of U.S. Utility application Ser. No. 16/401,492, entitled "DETERMINATION METHOD, ACCESS, TRANSMISSION, PROCESSING METHOD AND DEVICE, BASE STATION AND TERMINAL", filed May 2, 2019, which is a continuation of P.C.T. Application Serial No. PCT/CN2017/109117, entitled "DETERMINATION METHOD, ACCESS, TRANSMISSION, PROCESSING METHOD AND DEVICE, BASE STATION AND TERMINAL", filed Nov. 2, 2017, which claims priority to Chinese Application Serial No. 201610982012.8, entitled "DETERMINATION METHOD, ACCESS, TRANSMISSION, PROCESSING METHOD AND DEVICE, BASE STATION AND TERMINAL", filed Nov. 4, 2016, all of which are hereby incorporated by reference in their entirety and made part of the present U.S. Utility patent application for all purposes.

TECHNICAL FIELD

The present disclosure relates to the field of wireless communication and, in particular, relates to a determination, access, sending and processing method and device, base station and terminal.

BACKGROUND

In the new generation mobile communications system, system networking will be performed on carrier frequencies higher than those used in the second generation (2G), third generation (3G), and fourth generation (4G) systems. Currently, the frequency bands widely recognized by the industry and identified by international organizations are mainly 3 GHz to 6 GHz, and 6 GHz to 100 GHz. With respect to networking frequencies of early communications systems, these frequency bands are relatively high, have greater loss in propagation, and have a relatively smaller coverage radius at the same power level. This also determines that the beamforming technology may be adopted for increasing the coverage radius in the networking of the new generation mobile communications system. The initial access has higher requirements for coverage, and requires a coverage range greater than that required by the service. The beamforming technology is therefore used.

SUMMARY

A summary of the subject matter is described hereinafter in detail. This summary is not intended to limit the scope of the claims.

The embodiments of the present disclosure provide a determination, access, sending and processing method and device, base station and terminal.

The technical solutions of the present disclosure are implemented as follows.

An embodiment of the present disclosure provides a method for determining an uplink receiving beam. The method is applied to a base station and includes:
  receiving, by using N receiving configurations, a random access signal sent by a terminal, where N is an integer equal to or greater than 2;
  obtaining respective receiving state information corresponding to the N receiving configurations; and
  determining the receiving configuration of the uplink receiving beam according to the receiving state information.

An embodiment of the present disclosure provides a random access method. The method is applied to a terminal and includes:
  determining a signal format;
  forming a random access signal according to the signal format; and sending the random access signal to a base station.

An embodiment of the present disclosure provides a random access method. The method is applied to a terminal and includes:
  determining a signal format;
  forming a random access signal according to the signal format; and
  sending at least a part of the random access signal by using the number S of sending configurations, where S is an integer greater than or equal to 1.

An embodiment of the present disclosure provides a method for determining an uplink receiving beam. The method is applied to a base station and includes:
  respectively receiving a random access signal sent by a terminal using a plurality of sending configurations, where at least a part of the random access signal is sent by using one of the plurality of sending configurations; and determining the receiving configuration of the uplink receiving beam according to the receiving state information of the random access signal sent by using different configurations.

An embodiment of the present disclosure provides a method for determining an uplink receiving beam. The method includes:
  sending a specified downlink signal for multiple times by using a plurality of sending configurations;
  receiving a random access signal sent by a terminal;
  determining, according to a receiving parameter of the random access signal, a receiving configuration of the specified downlink signal corresponding to the access signal sent by the terminal; and
  determining a receiving configuration of the uplink receiving beam according to the receiving configuration of the specified downlink signal corresponding to the access signal sent by the terminal.

An embodiment of the present disclosure provides a method for determining an uplink receiving beam. The method includes:
  receiving a plurality of specified downlink signals sent by a base station by using different sending configurations;
  selecting a random access resource according to receiving state information of the specified downlink signals; and
  sending a random access signal by using the random access resource.

An embodiment of the present disclosure provides a device for determining an uplink receiving beam. The device is applied to a base station and includes a first receiving unit, a first obtaining unit and a first determination unit.

The first receiving unit is configured to receive, by using N receiving configurations, a random access signal sent by a terminal. N is an integer equal to or greater than 2.

The first obtaining unit is configured to obtain respective receiving state information corresponding to the N receiving configurations.

The first determination unit is configured to determine the receiving configuration of an uplink receiving beam according to the receiving state information.

An embodiment of the present disclosure provides a random access device. The device is applied to a terminal and includes a third determination unit, a first forming unit, and a second sending unit.

The third determination unit is configured to determine a signal format.

The first forming unit is configured to form a random access signal according to the signal format.

The second sending unit is configured to send the random access signal to a base station.

An embodiment of the present disclosure provides a random access device. The device is applied to a terminal and includes a fourth determination unit, a second forming unit, and a third sending unit.

The fourth determination unit is configured to determine a signal format.

The second forming unit is configured to form a random access signal according to the signal format.

The third sending unit is configured to send at least a part of the random access signal by using the number S of sending configurations. S is an integer greater than or equal to 1.

An embodiment of the present disclosure provides a device for determining an uplink receiving beam. The device is applied to a base station and includes a fourth receiving unit and a fourth determination unit.

The fourth receiving unit is configured to respectively receive a random access signal sent by a terminal using a plurality of sending configurations. At least a part of the random access signal is sent by using one of the plurality of sending configurations.

The fourth determination unit is configured to determine the receiving configuration of the uplink receiving beam according to the receiving state information of the random access signal sent by using different configurations.

An embodiment of the present disclosure provides a device for determining an uplink receiving beam. The device includes a fifth sending unit, a fifth receiving unit, a fifth determination unit and a sixth determination unit.

The fifth sending unit is configured to send a specified downlink signal for multiple times by using a plurality of sending configurations.

The fifth receiving unit is configured to receive a random access signal sent by a terminal.

The fifth determination unit is configured to determine, according to a receiving parameter of the random access signal, a receiving configuration of the specified downlink signal corresponding to the access signal sent by the terminal.

The sixth determination unit is configured to determine a receiving configuration of the uplink receiving beam according to the receiving configuration of the specified downlink signal corresponding to the access signal sent by the terminal.

An embodiment of the present disclosure provides a device for determining an uplink receiving beam. The device is applied to a terminal and includes a sixth receiving unit, a selection unit and a sixth sending unit.

The sixth receiving unit is configured to receive a plurality of specified downlink signals sent by a base station by using different sending configurations.

The selection unit is configured to select a random access resource according to receiving state information of the specified downlink signals.

The sixth sending unit is configured to send a random access signal by using the random access resource.

An embodiment of the present disclosure provides a base station. The base station includes a first receiving antenna and a first processor.

The first receiving antenna is configured to receive, by using N receiving configurations, a random access signal sent by a terminal. N is an integer equal to or greater than 2.

The first processor is configured to obtain respective receiving state information corresponding to the N receiving configurations, and determine a receiving configuration of an uplink receiving beam according to the receiving state information.

An embodiment of the present disclosure provides a terminal. The terminal includes a second processor and a first sending antenna.

The second processor is configured to determine a signal format and form a random access signal according to the signal format.

The first sending antenna is configured to send the random access signal to a base station.

An embodiment of the present disclosure provides a terminal. The terminal includes a third processor and a second sending antenna.

The third processor is configured to determine a signal format and form a random access signal according to the signal format.

The second sending antenna is configured to send at least a part of the random access signal by using the number S of sending configurations. S is an integer greater than or equal to 1.

An embodiment of the present disclosure provides a base station. The base station includes a fourth receiving antenna and a fourth processor.

The fourth receiving antenna is configured to respectively receive a random access signal sent by a terminal using a plurality of sending configurations. At least a part of the random access signal is sent by using one of the plurality of sending configurations.

The fourth processor is configured to determine the receiving configuration of the uplink receiving beam according to the receiving state information of the random access signal sent by using different configurations.

An embodiment of the present disclosure provides a base station. The base station includes a fourth sending antenna, a fifth receiving antenna and a fifth processor.

The fourth sending antenna is configured to send a specified downlink signal for multiple times by using a plurality of sending configurations.

The fifth receiving antenna is configured to receive a random access signal sent by a terminal.

The fifth processor is configured to determine, according to a receiving parameter of the random access signal, a receiving configuration of the specified downlink signal corresponding to the access signal sent by the terminal; and determine a receiving configuration of the uplink receiving beam according to the receiving configuration of the specified downlink signal corresponding to the access signal sent by the terminal.

An embodiment of the present disclosure provides a base station. The base station includes a sixth receiving antenna, a sixth processor and a fifth sending antenna.

The sixth receiving antenna is configured to receive a plurality of specified downlink signals sent by the base station by using different sending configurations.

The sixth processor is configured to select a random access resource according to receiving state information of the specified downlink signals.

The fifth sending antenna is configured to send a random access signal by using the random access resource.

An embodiment of the present disclosure provides a signaling notification method. The method includes:
sending, by a base station, indication information of a random access signal to a terminal.

The indication information includes at least one of: a preamble format, a number of repetitions of the preamble format, or a repetition type of the preamble format.

An embodiment of the present disclosure provides a signaling receiving method. The method includes:
receiving indication information of a random access signal from a base station.

The indication information includes at least one of: a preamble format, a number of repetitions of the preamble format, or a repetition type of the preamble format.

An embodiment of the present disclosure provides a base station. The base station includes a seventh sending unit.

The seventh sending unit is configured to send, by the base station, indication information of a random access signal to a terminal.

The indication information includes at least one of: a preamble format, a number of repetitions of the preamble format, or a repetition type of the preamble format.

An embodiment of the present disclosure provides a terminal. The terminal includes a seventh receiving unit.

The seventh receiving unit is configured to receive indication information of a random access signal from a base station.

Embodiments of the present disclosure provide a computer-readable storage medium configured to store computer-executable instructions which, when executed by a processor, implement any one of the above-mentioned methods.

The indication information includes at least one of: a preamble format, a number of repetitions of the preamble format, or a repetition type of the preamble format. The embodiments of the present disclosure provide a method and device for determining an uplink receiving beam, a random access method and device, base station and terminal. In a first aspect, the base station may receive a random access signal by using multiple receiving configurations, thereby obtaining multiple pieces of receiving state information, and then selects a receiving configuration of the downlink receiving beam according to the receiving state information, so that the terminal does not send multiple random access signals, thereby reducing the power consumption of sending the random access signal by the terminal and reducing the communication resources occupied by the random access signal sent for multiple times. In a second aspect, the terminal sends a random access signal by simultaneously using multiple sending parameters, and the base station naturally receives the random access signal sent by using each sending parameter, so that the receiving configuration of the downlink receiving beam may also be determined according to the receiving state information of the random access signal. In a third aspect, the terminal first receives the specified downlink signal, and according to the receiving state information of the specified downlink signal, selects a corresponding random access resource, and send the corresponding random access resource to the base station. Then the base station may determine the receiving configuration of the uplink receiving beam according to a corresponding relationship among receiving time of the random access signal, the random access resource of the random access signal and the sending resource of the specified downlink signal. In this way, the terminal also only needs to send a random access signal. In summary, the number of random access signals sent by the terminal is reduced, thereby reducing the signaling overhead of the random access signal, the power consumption of the terminal, and the occupied communication resources.

Other aspects can be understood after the drawings and detailed description are read and understood.

DETAILED DESCRIPTION

Since the beam is narrow, in order to accurately focus the beam on the communication device, beam training is required to select the optimal or sub-optimal beam. The scenario that occurs during the access process is as follows. Since the transmitting and receiving channels of the base station have no reciprocity, the optimal downlink beam selected by the terminal is not necessarily the optimal uplink beam for reception by the base station. At this time, the terminal sends the random access signal for multiple times to facilitate the base station to receive the quality in receiving the random access signal for multiple times to determine the receiving beam. In this way, the terminal sends the random access signal for multiple times, the number of times the terminal sends the random access signal is large, the power consumption is large, and the process of selecting a beam by the base station is relatively cumbersome.

The present disclosure provides various solutions to address such an issue. Various embodiments of the solutions will be described below in detail in conjunction with the drawings and exemplary embodiments.

Figure 1:
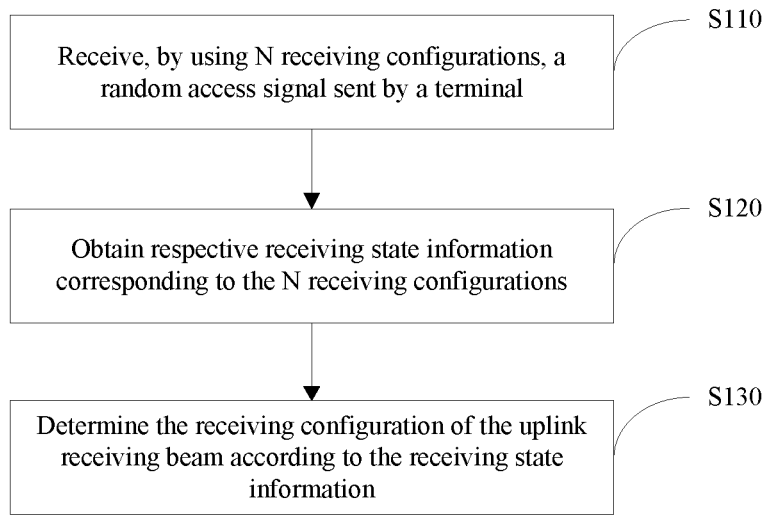
FIG. 1 is a flowchart of a first method for determining an uplink receiving beam according to an embodiment of the present disclosure.

As shown in FIG. 1, an embodiment provides a method for determining an uplink receiving beam.

The method is applied to a base station and includes the steps described below.

In step S110, a random access signal sent by a terminal is received by using N receiving configurations. N is an integer equal to or greater than 2.

In step S120, receiving state information corresponding to the N receiving configurations is obtained respectively.

In step S130, the receiving configuration of the uplink receiving beam is determined according to the receiving state information.

The method for determining an uplink receiving beam described in the embodiment is applied to a base station. The terminal may also be referred to as user equipment (UE). When the UE performs the random access, the UE sends a random access signal to the base station. In the embodiment, the base station uses the random access of the UE to preform subsequent determination of the receiving configuration of the uplink receiving beam for receiving data sent by the UE. The receiving configuration here may include at least one of the configuration parameters of a beam, such as a direction angle, a beam frequency, and a polarization direction of the uplink receiving beam.

In the embodiment, in order to select an optimal beam or a better beam for receiving data transmitted by the UE, the base station uses N receiving configurations. Any two of the N receiving configurations are at least partially different, so that the base station obtains multiple pieces of receiving state information of a random access signal sent by the UE. The receiving state information here may include parameters for indicating whether the receiving state is good or bad, such as received signal strength or received signal quality.

In step S130, a receiving configuration for receiving subsequent uplink data sent by the UE is selected according to the receiving state information. For example, the determined receiving configuration may be used for receiving uplink service data sent by the UE. The step S130 may include: selecting a receiving configuration that corresponds to the strongest received signal strength as the receiving configuration of the uplink receiving beam; alternatively, selecting a receiving configuration with the received signal strength greater than a preset strength as the receiving configuration of the subsequent uplink receiving beam. For example, with the receiving configuration A and the configuration B, a random access signal sent by the UE is received, and a received signal strength A and a received signal strength B are respectively obtained. If the received signal strength A is greater than the received signal strength B, the receiving configuration A may be selected in the step S130 as the receiving configuration for the base station to receive the uplink data, such as the uplink service data, of the UE.

The base station operates in this manner, and the UE only needs to send a random access signal to assist the base station to complete the determination of the receiving configuration of the uplink receiving beam, reducing the number of times the UE sends the random access signal, reducing the communication resource occupied for sending the random access signal, and reducing the power consumption of the UE.

The step S110 may be implemented in various manners, and at least two implementation manners are provided below.

In an implementation mode 1, the step S110 may include steps described below.

In the process of receiving a random access signal sent by the terminal, the random access signal is received by using one or more receiving configurations at the same time, and the random access signal is received by adjusting the receiving configuration at least once until the N receiving configurations are used.

In the embodiment, in the process of receiving a random access signal, the base station dynamically adjusts at least one of the receiving configurations until N receiving configurations are used for receiving the random access signal sent by the UE. For example, when the base station receives the random access signal with a receiving configuration, the base station dynamically adjusts the receiving configuration for receiving the random access signal (N−1) times. In the embodiment, the random access signal may be received in turn by using different receiving configurations in a time division multiplexing or polling manner in the time dimension.

In an implementation mode 2, the step S110 may include steps described below.

A random access signal sent by a terminal is received respectively and simultaneously by using N receiving configurations.

The random access signal is received simultaneously by using N receiving configurations. Thus, the base station obtains multiple pieces of receiving state information and selects a receiving configuration satisfying the selection condition through a comparison of the multiple pieces of receiving state information or a comparison between the multiple pieces of receiving state information and a preset threshold as the receiving configuration of the uplink receiving beam determined in the step S130.

The method further includes the steps described below before the step S110 is performed.

A first extended signal format is predetermined. The first extended signal format includes a first cyclic prefix and the N first preambles.

The signal format is sent to the terminal and is used for instructing the terminal to send the random access signal.

The first extended signal format may be a signal format of the random access signal. The first extended signal format provided by the embodiment includes a cyclic prefix and N preambles. In the embodiment, the cyclic prefix in the first extended signal format is a first cyclic prefix, and the preamble in the first extended signal format may be referred to as a first preamble. The signal format of the existing random access signal may be referred to as a basic signal format, or the signal format, of a random access signal, including a cyclic prefix and a preamble may also be referred to as a basic signal format. The cyclic prefix in the basic signal format is referred to as the basic cyclic prefix. The basic signal format is not limited to the random access signal format. A conventional orthogonal frequency division multiplexing (OFDM) symbol may also be referred to as a basic signal format, and a cyclic prefix of an OFDM symbol may also be referred to as a basic cyclic prefix.

In the embodiment, the length of the first cyclic prefix is equal to the length of the basic cyclic prefix in the basic signal format.

In some embodiments, the length difference between the length of the first cyclic prefix and the length of the basic cyclic prefix is within a preset range. The preset range here may be 20% and 10%. For example, the length of the first cyclic prefix is 20% longer than the length of the basic cyclic prefix.

In some other embodiments, the length of the first cyclic prefix is greater than or equal to M times the length of the basic cyclic prefix. M is a positive integer. In the embodiment, M may be equal to N.

The length of the first preamble may be equal to or slightly smaller or slightly larger than the length of the basic preamble of the basic signal format. For example, the length of the first preamble is 0.8 times the length of the basic preamble.

In the embodiment, any two of the first preambles may be the same or different.

In the embodiment, the base station sends the first extended signal format to the UE, which is equivalent to instructing the UE to use the first extended signal format to send the random access signal. In implementation, the base station may not send a signal format of the random access signal to the UE, and the UE may construct a random access signal according to the signal format stored by the UE. For example, the UE uses the basic signal format to send the random access signal. Of course, the UE may also send the random access signal in a signal format defined by a communication protocol.

In some embodiments, the step S110 may further include the steps described below.

When the length of the random access signal is greater than a first preset length, the random access signal is received in segments by using N receiving configurations.

If the length of a random access signal sent by the UE is long and the resource length of a random access resource is insufficient, the UE may perform transmission in segments. At this time, the base station receives a random access signal in segments in the step S110, for example, receives a random access signal in two segments.

The method further includes that a segmentation indication is sent to the terminal.

The step S110 may include a step described below.

When the length of the random access signal is greater than a first preset length, the random access signal sent based on the segmentation indication is received in segments.

When the UE is transmitted in segments, the number of segments may be indicated by the base station in advance. Therefore, in the embodiment, the base station further sends a segmentation indication to the terminal, and the base station receives, in the step S110, a random access signal that is sent in segments by the UE according to the segmentation indication. Thus, since the segmentation indication is sent by the base station, the base station needs to know the number of receiving times. The segmentation indication may be used to indicate transmission in segments, and may also be used to indicate the number of segments, and may also be used to indicate a segmentation interval, that is, a time interval or a frequency interval between two segment transmissions, etc., so as to facilitate the base station to select the receiving configuration in advance according to the segmentation indication.

Certainly, in implementation, the UE may also dynamically determine whether to perform transmission in segments. In the process of receiving, the base station may determine whether the random access signal is received completely according to the length of the received random access signal. If the random access signal is not received completely, it is considered to receive in segments.

Figure 2:
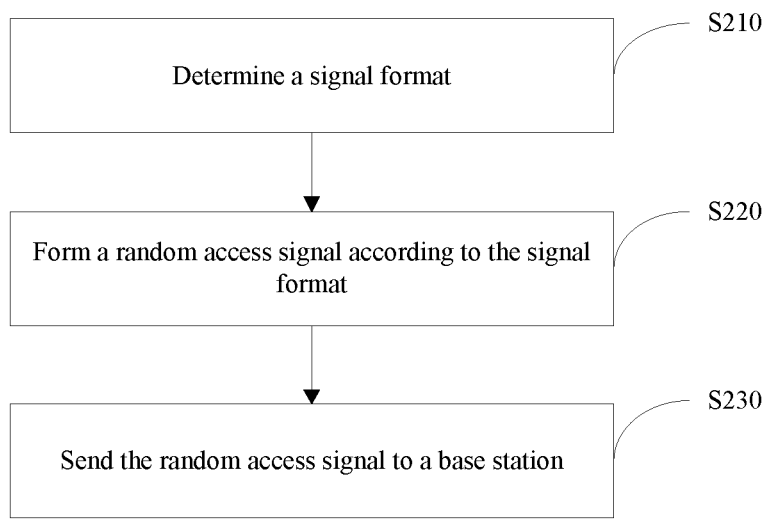
FIG. 2 is a flowchart of a first random access method according to an embodiment of the present disclosure.

As shown in FIG. 2, an embodiment provides a random access method. The method is applied to a terminal and includes the steps described below.

In step S210, a signal format is determined.

In step S220, a random access signal is formed based on the signal format.

In step S230, the random access signal is sent to a base station.

In the embodiment, the terminal first determines the signal format, and then forms the random access signal according to the signal format, and sends the random access signal to the base station.

In the embodiment, the random access signal format is used for the base station to receive the random access signal by using N receiving configurations, and to select a receiving configuration of the uplink receiving beam based on receiving state information of the N receiving configurations.

Thus, the UE assists the base station to complete the selection of the receiving configuration of the uplink receiving beam by only sending one random access signal to the base station. The number of random access signals sent by the UE is small, and thus the power consumption of the UE is reduced and the occupied communication resources are reduced.

In some embodiments, the step S210 may include receiving the first extended signal format from the base station. The first extended signal format includes a first cyclic prefix and N first preambles. N is an integer not less than 2. For example, a length of the first cyclic prefix is equal to a length of the basic cyclic prefix in the basic signal format; or a length difference between the length of the first cyclic prefix and the length of the basic cyclic prefix is within a preset range; or the length of the first cyclic prefix is greater than or equal to M times the length of the basic cyclic prefix. M is a positive integer. The length of the first preamble may be equal to or equivalent to the length of the basic preamble.

In some embodiments, the method further includes that the random access signal is transmitted in segments when the length of the random access signal is greater than the first preset length.

In the embodiment, if the random access signal is formed based on the first extended signal format, the length of the random access signal may be too long, for example, greater than the first preset length. The first preset length may be the resource length of a random access resource. Thus, one random access signal may not be completely transmitted on one random access resource, and in the embodiment, transmission in segments is performed. For example, one random access signal is transmitted on a plurality of random access resources.

The step in which the random access signal is transmitted in segments when the length of the random access signal is greater than the first preset length includes that: the number of segments is determined; and the random access signal is transmitted in segments according to the number of segments.

In the embodiment, the number of segments, such as 2 segments, 3 segments or more segments, is first determined. Segmentation may be performed in many manners, and several exemplary manners are provided below.

In the first manner, the step of determining the number of segments includes that: the segmentation indication sent by the base station is received; and the number of segments is determined based on the segmentation indication. In the embodiment, segmentation is performed directly according to the segmentation indication of the base station.

In the second manner, the step of determining the number of segments further includes that: the number of segments is determined according to the length of the random access signal and a length of a single random access resource. In the embodiment, the UE performs segmentation according to the length of the random access signal and the length of the single random access resource. In selection, the random access resources for transmitting a random access signal are selected to have a total length equal to or greater than the length of the random access signal, so as to ensure complete transmission of the random access signal.

Figure 3:
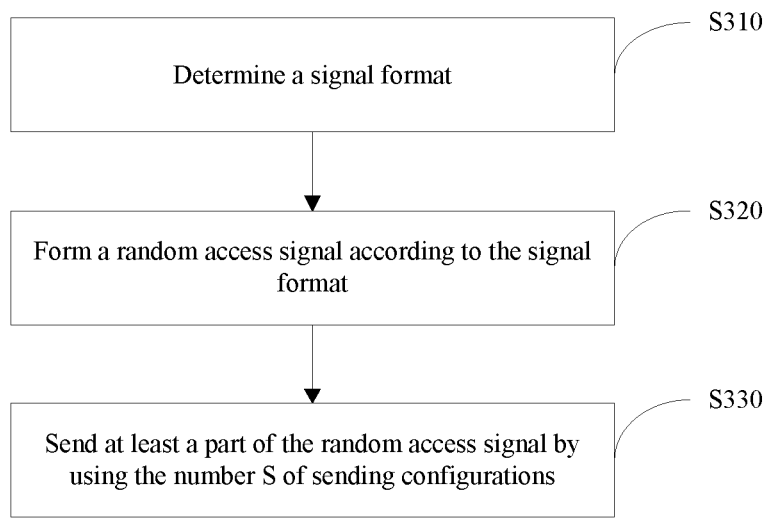
FIG. 3 is a flowchart of a second random access method according to an embodiment of the present disclosure.

As shown in FIG. 3, an embodiment provides a random access method. The method is applied to a terminal and includes the steps described below.

In step S310, a signal format is determined.

In step S320, a random access signal is formed according to the signal format.

In step S330, at least a part of the random access signal is sent by using the number S of sending configurations. S is an integer greater than or equal to 1.

In the embodiment, when the terminal sends a random access signal, S sending configurations are used for sending the random access signal. Each of the S sending configurations is used for sending all or part of the random access signal. Thus, different antennas corresponding to the multiple receiving configurations of the base station all receive the random access signal, so that the base station obtains multiple pieces of receiving state information, such as multiple reception strengths and/or multiple receiving qualities. According to the multiple pieces of receiving state information, the base station is convenient to select, through reception of a random access signal, a receiving configuration for receiving uplink data sent by the UE. For the receiving configuration here, reference may be made to at least one of the receiving frequency, the receiving direction, or the polarization direction in the foregoing embodiment. The sending configuration here may also be an antenna parameter, such as a sending frequency, a sending direction or a polarization direction, of a sending antenna.

In some embodiments, the step S310 may further include the steps described below.

A second extended signal format of the random access signal is received in advance from a base station. The second extended signal format includes: P1 second cyclic prefixes and P2 second preambles.

P2 is greater than or equal to P1, and at least one of the P1 second cyclic prefixes and at least one of the P2 second preambles are sent under each sending configuration.

In the embodiment, the UE receives the second extended signal format from the base station, and the second extended signal format may be described relative to the foregoing basic signal format. In the embodiment, P1 second cyclic prefixes and P2 second preambles are included. P2 is greater than or equal to P1. When P2 is equal to P1, the second cyclic prefixes and the second preambles are distributed in staggered manner in the second extended signal format. When P2 is greater than P1, any two of the second cyclic prefixes are not adjacently distributed, that is, at least one or more of the second preambles are disposed between any two of the second cyclic prefixes.

In the embodiment, the random access signal sent by the UE is formed based on the second extended signal format, and in implementation may be formed based on the basic signal format or the first extended signal format or other signal formats.

In some embodiments, if the second extended format is used, a phenomenon in which one random access signal is not be able to be completely transmitted on a random access resource may occur.

Therefore in the embodiment, the step 330 may further include that: the random access signal is transmitted in segments when the length of the random access signal is greater than the first preset length.

The step in which the random access signal is transmitted in segments when the length of the random access signal is greater than the first preset length includes the steps described below.

The number of segments is determined.

The random access signal is transmitted in segments according to the number of segments.

Similarly, in the embodiment, transmission in segments may also be performed in multiple manners described below.

Manner 1:

The step of determining the number of segments includes the steps described below.

A segmentation indication sent by the base station is received.

The number of segments is determined according to the segmentation indication. For the relevant description of the segmentation indication here, reference may be made to the corresponding part of the foregoing embodiment, and details are not repeated here.

Manner 2:

The step of determining the number of segments further includes the steps described below.

The number of segments is determined according to the length of the random access signal and a data length corresponding to a single random access resource.

Figure 4:
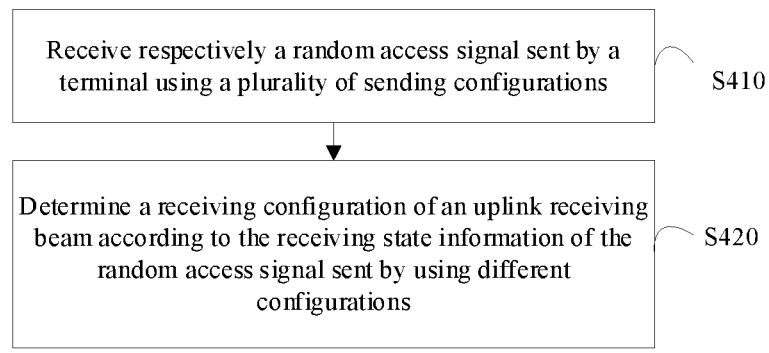
FIG. 4 is a flowchart of a second method for determining an uplink receiving beam according to an embodiment of the present disclosure.

As shown in FIG. 4, an embodiment provides a method for determining an uplink receiving beam.

The method is applied to a base station and includes the steps described below.

In step S410, a random access signal sent by a terminal is received using a plurality of sending configurations respectively. At least a part of the random access signal is sent by using one of the plurality of sending configurations.

In step S420, the receiving configuration of the uplink receiving beam is determined according to the receiving state information of the random access signal sent by using different configurations.

Thus, the base station receives a random access signal sent by the UE, and then obtains a plurality of received signal strengths or qualities, and selects a receiving configuration of the receiving antenna with the highest signal strength or the best received quality as the receiving configuration of the uplink receiving beam. Thus, determination of the receiving configuration of the uplink receiving beam is completed through reception of one random access signal.

In some embodiments, the method further includes a step described below.

A second extended signal format of the random access signal is sent. The second extended signal format includes P1 second cyclic prefixes and P2 second preambles. P2 is equal to or greater than P1. At least one of the P1 second cyclic prefixes and at least one of the P2 second preambles are sent under each sending configuration. Any two of the second cyclic prefixes are not adjacently arranged in the second extended signal format. For the definition of the second extended signal format, reference may be made to the corresponding embodiments described above. In implementation, the second extended signal format further includes a guard time. The guard time is located behind each of the second cyclic prefix and the second preamble.

Figure 5:
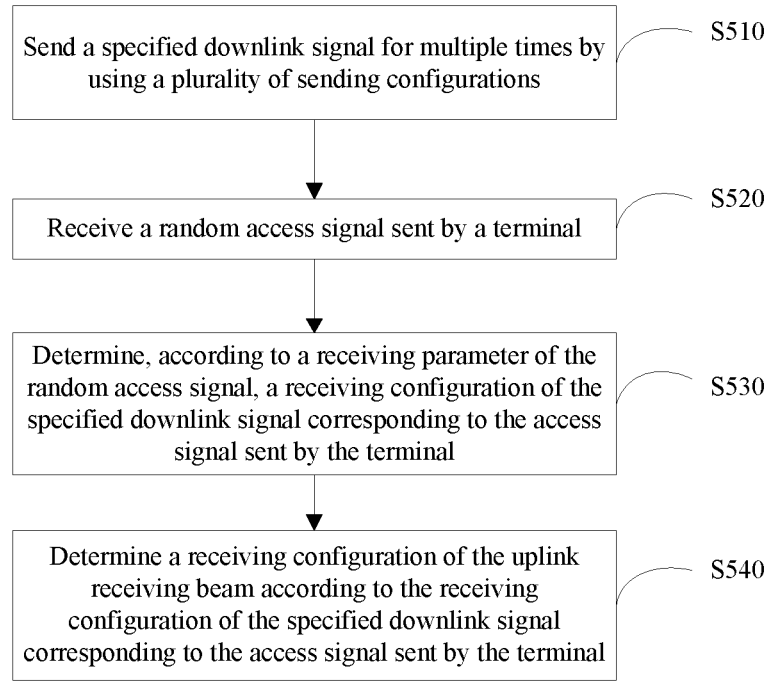
FIG. 5 is a flowchart of a third method for determining an uplink receiving beam according to an embodiment of the present disclosure.

As shown in FIG. 5, an embodiment provides a method for determining an uplink receiving beam.

The method includes the steps described below.

In step S510, a specified downlink signal is sent for multiple times by using a plurality of sending configurations.

In step S520, a random access signal sent by a terminal is received.

In step S530, a receiving configuration of the specified downlink signal corresponding to the access signal sent by the terminal is determined according to a receiving parameter of the random access signal.

In step S540, a receiving configuration of the uplink receiving beam is determined according to the receiving configuration of the specified downlink signal corresponding to the access signal sent by the terminal.

The specified downlink signal here may include a synchronization signal or a signal at part of time or frequency position of a broadcast channel. The synchronization signal may include a primary synchronization signal, a secondary synchronization signal, and the like.

In the embodiment, the base station first sends the specified downlink signal for multiple times, receives a random access signal sent by the terminal based on the receiving state information of the specified downlink signal; and determines the receiving configuration of the downlink signal according to the receiving time of the random access signal. If the signal quality of a received random access signal is good, the terminal selects a random access resource corresponding to a time-domain sending resource of the specified downlink signal, and sends the random access signal.

The receiving parameter in the step S530 may include information such as receiving time of the random access signal or a corresponding frequency band of the random access resource of the random access signal, or a serial number of the random access resource for sending the random access signal. The sending resource of each specified downlink signal has an association relationship with at least one random access resource, and the association relationship may be a time association relationship or a frequency association relationship. For example, the time association relationship may be expressed in that time corresponding to two resources is within a preset range, and the frequency association relationship may be expressed in that frequency bands used by two resources differ by a predetermined value or differ within a preset range. Therefore, in the step S530, the downlink signal based on which the terminal sends the random access signal may be determined based on the receiving parameter and the association relationship. The base station may notify the terminal of the association relationship in advance.

Therefore, in the step S540 in the embodiment, the receiving configuration of the specified downlink signal may be used as the receiving configuration of the uplink receiving beam, and thereby the receiving configuration of the uplink receiving beam is determined so as to subsequently receive the uplink service data or uplink request information or the like of the UE.

In some embodiments, the step S540 may include that: at least one of a beam frequency, a receiving angle or a polarization direction of the uplink receiving beam is determined according to the receiving configuration.

In some embodiments, the method further includes that: a resource starting position of the random access resource is sent to the terminal.

The resource starting position of the random access resource is sent to the terminal, which is equivalent to indicating the terminal positions at which the resource starting position is selected based on the specified downlink signal. In this way, the base station does not need to indicate the position of each random access resource to the terminal one by one.

Figure 6:
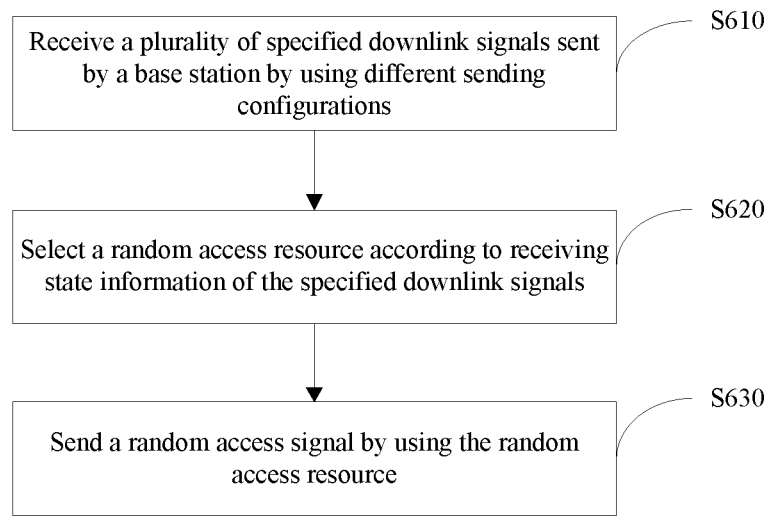
FIG. 6 is a flowchart of a third random access method according to an embodiment of the present disclosure.

As shown in FIG. 6, an embodiment provides a method for determining an uplink receiving beam.

The method includes the steps described below.

In step S610, a plurality of specified downlink signals sent by a base station are received by using different sending configurations.

In step S620, a random access resource is selected according to receiving state information of the specified downlink signals.

In step S630, a random access signal is sent by using the random access resource.

In the embodiment, the terminal receives the specified downlink signal sent by the base station by using different sending configurations. The sending configuration may be a sending direction, a planning direction, and the like. The specified downlink signal here may be the aforementioned synchronization signal or the like. In the step S620, a random access resource is determined according to receiving state information of each specified downlink signal, and the random access signal is sent by using the selected random access resource. Thus, the base station may determine, according to the resource correlation, the specified downlink signal which has a higher reception strength or a better receiving quality, and then determine the receiving configuration of the uplink receiving beam according to the correlation between the sending configuration of the specified downlink signal and the receiving configuration of the uplink receiving beam. In this way, the random access signal may be prevented from being sent for multiple times by the terminal. The specified downlink signal is also a signal, such as a synchronization signal, having other functions, thereby reducing the occupied communication resources and the power consumption of the terminal.

In implementation, receiving time of the random access signal is used for the base station to select the receiving configuration of the uplink receiving beam. Reference may be made to the corresponding part of the foregoing embodiment to determine the receiving configuration of the uplink receiving beam.

In some embodiments, the step S620 may include that: when a reception strength of a specified downlink signal sent under a sending configuration satisfies a preset condition, a random access resource closest to receiving time of the specified downlink signal is selected to send the random access signal.

In some embodiments, when a reception strength of a specified downlink signal sent under a sending configuration satisfies the preset condition and according to an order or a serial number of the specified downlink signal with the reception strength satisfying the preset condition, a random access resource corresponding to the order or the serial number is selected.

For example, the random access resources and the sending resources for sending the specified downlink signal are respectively sorted or numbered. For example, the receiving quality of the specified downlink signal sent on the third sending resource is the best or the reception strength of the specified downlink signal sent on the third sending resource is the greatest or greater than the preset threshold, the terminal selects the third random access resource to send the random access signal. In the embodiment, the "correspondence" here may be having the same sequence or having the same serial number or corresponding to each other.

In some embodiments, the step S620 may include that: a random access resource is selected for sending the random access signal. A time difference between the time corresponding to the random access resource and the receiving time of receiving the specified downlink signal by the terminal is a preset time interval. Thus, when the base station receives the association relationship between the receiving time of the random access signal and the sending time of the specified downlink signal, the base station can determine the specified downlink signal based on which the random access signal is currently sent by the terminal, to simplify the operation of the base station.

Figure 7:
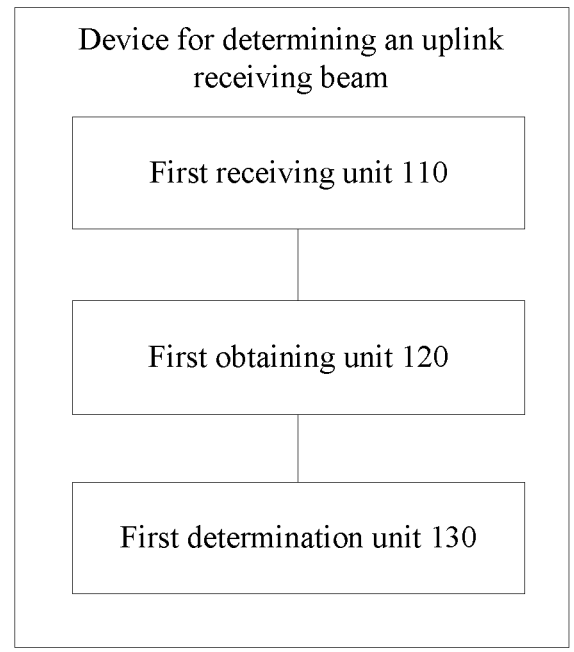
FIGS. 7, 10, 11 and 12 are structural diagrams of devices for determining an uplink receiving beam according to an embodiment of the present disclosure.

As shown in FIG. 7, an embodiment provides a device for determining an uplink receiving beam.

The device is applied to a base station and includes a first receiving unit or device 110, a first obtaining unit or device 120 and a first determination unit or device 130.

The first receiving unit 110 is configured to receive, by using N receiving configurations, a random access signal sent by a terminal. N is an integer equal to or greater than 2.

The first obtaining unit 120 is configured to obtain respective receiving state information corresponding to the N receiving configurations.

The first determination unit 130 is configured to determine the receiving configuration of an uplink receiving beam according to the receiving state information.

The determination device in the embodiment may be an information processing structure applied to the base station. The first receiving unit 110 may correspond to an air interface of the base station, and can receive the random access signal from the terminal.

The first obtaining unit 120 and the first determination unit 130 each may correspond to a processor or a processing circuit in the base station. The processor may include a central processing unit, a microcontroller unit, an application processor, a digital signal processor or a programmable array, and the like. The processing circuit may include an application specific integrated circuit.

The processor or processing circuit may implement the functions of the first obtaining unit 120 and the first determination unit by executing preset instructions.

In some embodiments, in the process of receiving a random access signal sent by the terminal, the first receiving unit 110 is configured to receive the random access signal by using one or more receiving configurations at the same time, and receive the random access signal by adjusting the receiving configuration at least once until the N receiving configurations are used.

In other embodiments, the first receiving unit 110 is configured to respectively and simultaneously receive a random access signal sent by the terminal by simultaneously using N receiving configurations.

In addition, the device further includes a second determination unit and a first sending unit.

The second determination unit is configured to predetermine a first extended signal format. The first extended signal format includes a first cyclic prefix and N first preambles.

The first sending unit is configured to send the signal format to the terminal and the signal format is used for instructing the terminal to send the random access signal.

The hardware structure of the second determination unit here may be similar to the hardware structure of the first determination unit. The first sending unit may correspond to an antenna of the base station, and may be used to send information to the terminal.

In the embodiment, a length of the first cyclic prefix is equal to a length of the basic cyclic prefix in the basic signal format; or a length difference between the length of the first cyclic prefix and the length of the basic cyclic prefix is within a preset range; or the length of the first cyclic prefix is greater than or equal to M times the length of the basic cyclic prefix. M is a positive integer.

In some embodiments, the first receiving unit 110 is configured to receive the random access signal in segments by using the N receiving configurations when the length of the random access signal is greater than the first preset length.

For example, the device further includes a first sending unit, which is configured to send a segmentation indication to the terminal. The first receiving unit 110 is configured to receive in segments the random access signal sent based on the segmentation indication when the length of the random access signal is greater than the first preset length. In reception in segments, each segment of the random access signal may be received by using one or more receiving configurations.

Figure 8:
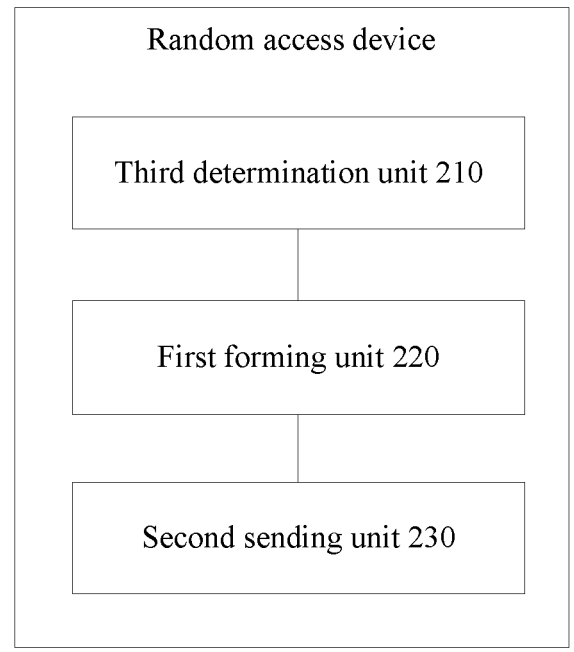
FIGS. 8 and 9 are structural diagrams of random access devices according to an embodiment of the present disclosure.

As shown in FIG. 8, an embodiment provides a random access device. The device is applied to a terminal and includes a third determination unit or device 210, a first forming unit or device 220 and a second sending unit or device 230.

The third determination unit 210 is configured to determine a signal format.

The first forming unit 220 is configured to form a random access signal according to the signal format.

The second sending unit 230 is configured to send the random access signal to a base station.

The random access device in the embodiment is an information processing structure applied to the terminal. The third determination unit 210 and the first forming unit 220 each may correspond to a processor or a processing circuit. The second sending unit 230 may correspond to a sending antenna of the terminal, and may be used to send a random access signal.

In some embodiments, the random access signal format is used for the base station to receive the random access signal by using N receiving configurations, and to select a receiving configuration of the uplink receiving beam based on receiving state information of the N receiving configurations.

In some embodiments, the third determination unit 210 is configured to receive the first extended signal format from the base station. The first extended signal format includes a first cyclic prefix and N first preambles.

In an exemplary embodiment, a length of the first cyclic prefix is equal to a length of the basic cyclic prefix in the basic signal format; or a length difference between the length of the first cyclic prefix and the length of the basic cyclic prefix is within a preset range; or the length of the first cyclic prefix is greater than or equal to M times the length of the basic cyclic prefix. M is a positive integer.

In some embodiments, the second sending unit 230 is configured to transmit the random access signal in segments when the length of the random access signal is greater than the first preset length.

In some embodiments, the second sending unit 230 is configured to determine the number of segments, and transmit the random access signal in segments according to the number of segments.

In addition, the device further includes a second receiving unit.

The second receiving unit is configured to receive a segmentation indication sent by the base station.

The second sending unit is configured to determine the number of segments according to the segmentation indication.

The second receiving unit may correspond to a receiving antenna and may be configured to receive a segmentation indication sent by the base station.

In some embodiments, the second sending unit 230 is configured to determine the number of segments according to the length of the random access signal and a length of a single random access resource.

Figure 9:
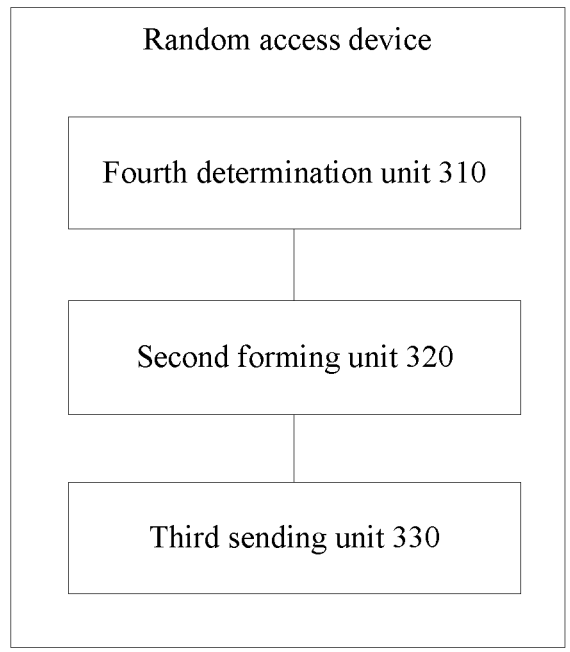

As shown in FIG. 9, an embodiment provides a random access device. The device is applied to a terminal and includes a fourth determination unit or device 310, a second forming unit or device 320 and a third sending unit or device 330.

The fourth determination unit 310 is configured to determine a signal format.

The second forming unit 320 is configured to form a random access signal according to the signal format.

The third sending unit 330 is configured to send at least a part of the random access signal by using the number S of sending configurations. S is an integer greater than or equal to 1.

The fourth determination unit 310 and the second forming unit 320 each may correspond to a processor or a processing circuit. The third sending unit 330 corresponds to a sending antenna or the like in the terminal.

In some embodiments, the fourth determination unit 310 is configured to receive a second extended signal format of the random access signal in advance from a base station. The second extended signal format includes: P1 second cyclic prefixes and P2 second preambles. P2 is equal to or greater than P1. At least one of the P1 second cyclic prefixes and at least one of the P2 second preambles are sent under each sending configuration. P1 and P2 are both positive integers.

In some other embodiments, the third sending unit 330 is configured to transmit the random access signal in segments when the length of the random access signal is greater than the first preset length.

In addition, the third sending unit 330 is configured to determine the number of segments, and transmit the random access signal in segments according to the number of segments.

For example, the device further includes: a third receiving unit, which is configured to receive a segmentation indication sent by the base station. The third sending unit is configured to determine the number of segments according to the segmentation indication. The third sending unit 330 may correspond to a sending antenna.

For example, the third sending unit 330 is configured to determine the number of segments according to the length of the random access signal and a data length corresponding to a single random access resource.

Figure 10:
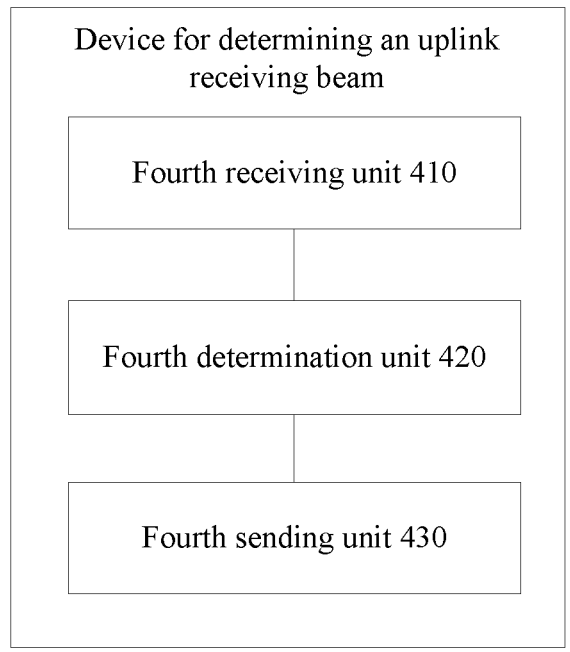

As shown in FIG. 10, an embodiment provides a device for determining an uplink receiving beam.

The device is applied to a base station and includes a fourth receiving unit or device 410 and a fourth determination unit or device 420.

The fourth receiving unit 410 is configured to respectively receive a random access signal sent by a terminal using a plurality of sending configurations. At least a part of the random access signal is sent by using one of the sending configurations.

The fourth determination unit 420 is configured to determine the receiving configuration of the uplink receiving beam according to the receiving state information of the random access signal sent by using different configurations.

The fourth receiving unit 410 may correspond to a receiving antenna. The fourth determination unit 420 may correspond to a processor or a processing circuit.

In some embodiments, the device further includes: a fourth sending unit 430, which is configured to send a second extended signal format of the random access signal. The second extended signal format includes P1 second cyclic prefixes and P2 second preambles. P2 is equal to or greater than P1. At least one of the P1 second cyclic prefixes and at least one of the P2 second preambles are sent under each sending configuration. The fourth sending unit may correspond to a sending antenna. P1 and P2 are both positive integers.

Figure 11:
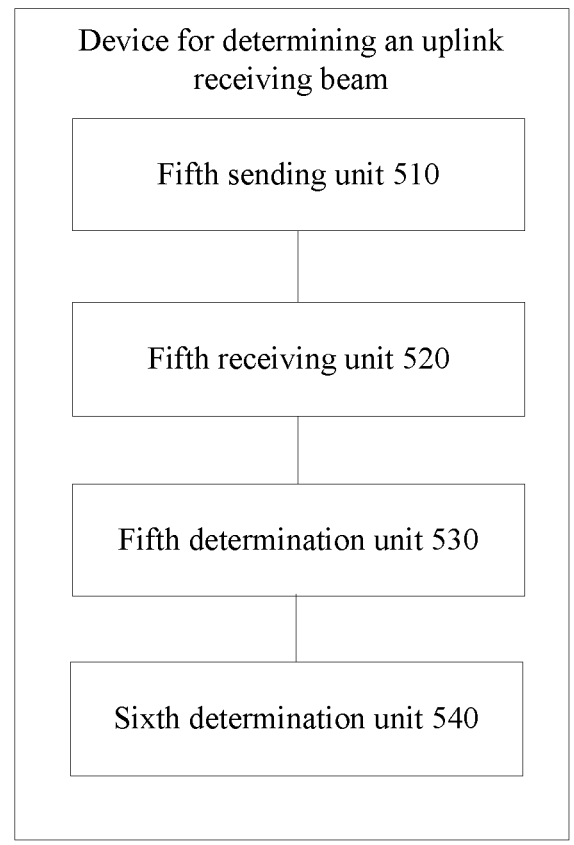

As shown in FIG. 11, an embodiment provides a device for determining an uplink receiving beam.

The device is applied to a base station and includes a fifth sending unit or device 510, a fifth receiving unit or device 520, a fifth determination unit or device 530 and a sixth determination unit or device 540.

The fifth sending unit 510 is configured to send a specified downlink signal for multiple times by using a plurality of sending configurations.

The fifth receiving unit 520 is configured to receive a random access signal sent by a terminal.

The fifth determination unit 530 is configured to determine, according to a receiving parameter of the random access signal, a receiving configuration of the specified downlink signal corresponding to the access signal sent by the terminal.

The sixth determination unit 540 is configured to determine a receiving configuration of the uplink receiving beam according to the receiving configuration of the specified downlink signal corresponding to the access signal sent by the terminal.

The device provided in the embodiment is applied to a base station such as an evolved nodeB (eNB). The fifth sending unit 510 and the fifth receiving unit 520 both correspond to the communication interface, and are capable of performing information interaction with the terminal.

The fifth determination unit 530 and the sixth determination unit 540 each may correspond to a processor or a processing circuit.

In some embodiments, the fifth determination unit 530 is configured to determine at least one of a beam frequency, a receiving angle, and a polarization direction of the uplink receiving beam according to the receiving configuration.

The fifth sending unit 510 is further configured to send a resource starting position of the random access resource to the terminal.

Figure 12:
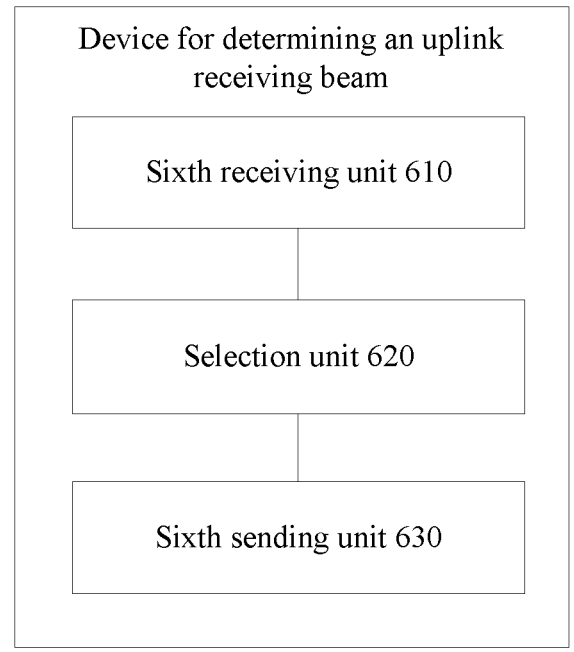

As shown in FIG. 12, an embodiment provides a device for determining an uplink receiving beam.

The device is applied to a terminal and includes a sixth receiving unit or device 610, a selection unit or device 620 and a sixth sending unit or device 630.

The sixth receiving unit 610 is configured to receive a plurality of specified downlink signals sent by a base station by using different sending configurations.

The selection unit 620 is configured to select a random access resource according to receiving state information of the specified downlink signals.

The sixth sending unit 630 is configured to send a random access signal by using the random access resource.

The sixth receiving unit 610 and the sixth sending unit 630 each correspond to a transceiver antenna in the terminal. The selection unit 620 corresponds to a processor or a processing circuit.

In some embodiments, receiving time of the random access signal is used for the base station to determine the receiving configuration of the uplink receiving beam.

In some embodiments, the selection unit 620 is configured to select a random access resource closest to receiving time of the specified downlink signal to send the random access signal when a reception strength of a specified downlink signal sent under a sending configuration satisfies a preset condition; or according to an order or a serial number of the specified downlink signal with the reception strength satisfying the preset condition, select a random access resource corresponding to the order or the serial number selecting when a reception strength of a specified downlink signal sent under a sending configuration satisfies the preset condition.

In some embodiments, the selection unit 620 is configured to select a random access resource for sending the random access signal. A time difference between the time corresponding to the random access resource and the receiving time of receiving the specified downlink signal by the terminal is a preset time interval.

An embodiment further provides a base station. The base station includes a first receiving antenna and a first processor.

The first receiving antenna is configured to receive, by using N receiving configurations, a random access signal sent by a terminal. N is an integer equal to or greater than 2.

The first processor is configured to obtain respective receiving state information corresponding to the N receiving configurations, and determine a receiving configuration of an uplink receiving beam according to the receiving state information.

The first receiving antenna may be any receiving antenna in the base station. The first processor may be any type of processor, such as a central processing unit (CPU), a microcontroller unit (MCU), a digital signal processor (DSP), an application processor (AP), or a programmable array (e.g., PLC), or the like.

In the process of receiving a random access signal sent by the terminal, the first receiving antenna is configured to receive the random access signal by using one or more receiving configurations at the same time, and receive the random access signal by adjusting the receiving configuration at least once until the N receiving configurations are used.

In other embodiments, the first receiving antenna is configured to respectively and simultaneously receive a random access signal sent by the terminal by simultaneously using N receiving configurations.

An embodiment further provides a terminal. The terminal includes a second processor and a first sending antenna.

The second processor is configured to determine a signal format and form a random access signal according to the signal format.

The first sending antenna is configured to send the random access signal to a base station.

The first processor may be a CPU, an MCU, a DSP, an AP, a PLC or the like. The first sending antenna may be any type of sending antenna for sending a wireless signal.

The terminal further includes a second receiving antenna.

The second receiving antenna is configured to receive a first extended signal format from the base station. The first extended signal format includes a first cyclic prefix and N first preambles.

An embodiment provides another terminal. The terminal includes a third processor and a second sending antenna.

The third processor is configured to determine a signal format and form a random access signal according to the signal format.

The second sending antenna is configured to send at least a part of the random access signal by using the number S of sending configurations. S is an integer greater than or equal to 1.

The third processor may be a CPU, an MCU, a DSP, an AP, a PLC or the like. The second sending antenna may be any type of sending antenna.

In an exemplary embodiment, the terminal further includes a third receiving antenna, which is configured to receive a second extended signal format of the random access signal in advance from a base station. The second extended signal format includes: P1 second cyclic prefixes and P2 second preambles. P2 is equal to or greater than P1. At least one of the P1 second cyclic prefixes and at least one of the P2 second preambles are sent under each sending configuration. P1 and P2 are both positive integers not less than 1.

An embodiment of the present disclosure further provides another base station. The base station includes a fourth receiving antenna and a fourth processor.

The fourth receiving antenna is configured to respectively receive a random access signal sent by a terminal using a plurality of sending configurations. At least a part of the random access signal is sent by using one of the plurality of sending configurations.

The fourth processor is configured to determine the receiving configuration of the uplink receiving beam according to the receiving state information of the random access signal sent by using different configurations.

The fourth receiving antenna may be one of various antennas, such as a multiple-in-multiple-out (MIMO) antenna, for receiving signals sent by the terminal. The fourth processor may be a CPU, an MCU, a DSP, an AP, a PLC or the like.

In an exemplary embodiment, the base station further includes: a third sending antenna, which is configured to send a second extended signal format of the random access signal. The second extended signal format includes P1 second cyclic prefixes and P2 second preambles. P2 is equal to or greater than P1. At least one of the P1 second cyclic prefixes and at least one of the P2 second preambles are sent under each sending configuration.

An embodiment provides a base station. The base station includes a fourth sending antenna, a fifth receiving antenna and a fifth processor.

The fourth sending antenna is configured to send a specified downlink signal for multiple times by using a plurality of sending configurations.

The fifth receiving antenna is configured to receive a random access signal sent by a terminal.

The fifth processor is configured to determine, according to a receiving parameter of the random access signal, a receiving configuration of the specified downlink signal corresponding to the access signal sent by the terminal; and determine a receiving configuration of the uplink receiving beam according to the receiving configuration of the specified downlink signal corresponding to the access signal sent by the terminal.

The fifth processor may be a CPU, an MCU, a DSP, an AP, or a PLC, or the like. The fourth sending antenna may send a signal to the terminal. The fifth receiving antenna may receive a signal sent by the terminal. In an exemplary embodiment, the fourth sending antenna is configured to send a resource starting position of the random access resource to the terminal.

An embodiment further provides another base station. The base station includes a sixth receiving antenna, a sixth processor and a fifth sending antenna.

The sixth receiving antenna is configured to receive a plurality of specified downlink signals sent by the base station by using different sending configurations.

The sixth processor is configured to select a random access resource according to receiving state information of the specified downlink signals.

The fifth sending antenna is configured to send a random access signal by using the random access resource.

The sixth processor may be a CPU, an MCU, a DSP, an AP, a PLC or the like. The sixth receiving antenna and the fifth sending antenna each correspond to a transceiver antenna.

In an exemplary embodiment, the sixth processor is configured to select a random access resource closest to receiving time of the specified downlink signal to send the random access signal when a reception strength of a specified downlink signal sent under a sending configuration satisfies a preset condition; or according to an order or a serial number of the specified downlink signal with the reception strength satisfying the preset condition, select a random access resource corresponding to the order or the serial number selecting when a reception strength of a specified downlink signal sent under a sending configuration satisfies the preset condition.

An embodiment of the present disclosure provides a signaling notification method. The method includes the steps described below.

A base station sends indication information of a random access signal to a terminal.

The indication information includes at least one of: a preamble format, the number of repetitions of the preamble format, or a repetition type of the preamble format.

The preamble format may be a signal format of the random access signal, and is equivalent to the first extended signal format, the second extended signal format or the basic signal format described above.

In an exemplary embodiment, the preamble format is used for indicating a length of a cyclic prefix, the number of repetitions of a preamble sequence, and a length of the preamble sequence.

In an exemplary embodiment, the repetition type includes at least one of repetition with a cyclic prefix (CP) or repetition without the CP.

In an exemplary embodiment, the step in which the base station sends the indication information of the random access signal to the terminal includes the steps described below.

The indication information is broadcasted.

In an exemplary embodiment, the indication information is further used for indicating that no random access resource interval exists between two repetitions of the preamble format.

In an exemplary embodiment, the indication information is further used for instructing the terminal to send a random access signal corresponding to the repeated preamble format on a random access resource. A sending position of the random access resource is determined according to a downlink synchronization block index.

In an exemplary embodiment, the indication information is further used for instructing the terminal to send, on all random access resources, a random access signal generated through repetition of the preamble format in a case of repetition without a CP.

In an exemplary embodiment, the indication information is further used for instructing the terminal to send, on a plurality of random access resources, a random access signal generated through repetition of the preamble format in a case of repetition with a CP.

In an exemplary embodiment, the step in which the base station sends the indication information of the random access signal to the terminal includes a step described below.

The base station sends the indication information to the terminal for multiple times.

Repetition information is indicated in an information domain used for sending the number of repetitions in part of the indication information. The repetition information includes an indication of a resource position at which a random access signal with the repeated preamble format is sent.

An embodiment of the present disclosure further provides a signaling receiving method. The method includes a step described below.

Indication information of a random access signal is received from a base station.

The indication information includes at least one of: a preamble format, the number of repetitions of the preamble format, or a repetition type of the preamble format.

In an exemplary embodiment, the preamble format is used for indicating a length of a cyclic prefix, the number of repetitions of a preamble sequence, and a length of the preamble sequence.

In an exemplary embodiment, the repetition type includes at least one of repetition with a cyclic prefix (CP) or repetition without the CP.

In an exemplary embodiment, the step in which the indication information of the random access signal is received from the base station includes a step described below.

The indication information is received from broadcasting.

In an exemplary embodiment, the indication information is further used for indicating that no random access resource interval exists between two repetitions, repetition with a CP and repetition without a CP, of the preamble format.

In an embodiment, the method further includes the steps described below.

A random access resource is determined according to a downlink synchronization block index in a case of repetition with a CP.

A random access signal generated through repetition of the preamble format is sent on the random access resource.

In an embodiment, the method further includes a step described below.

In a case of repetition without a CP, a random access signal generated through repetition of the preamble format is sent on all random access resources.

In an embodiment, the method further includes a step described below.

In a case of repetition with a CP, a random access signal generated through repetition of the preamble format is sent on a plurality of random access resources.

In an embodiment, the method further includes a step described below.

The indication information is received for multiple times.

Repetition information is indicated in an information domain used for sending the number of repetitions in part of the indication information. The repetition information includes an indication of a resource position at which a random access signal with the repeated preamble format is sent.

An embodiment of the present disclosure provides a base station. The base station includes a seventh sending unit.

The seventh sending unit is configured to send, by the base station, indication information of a random access signal to a terminal.

The indication information includes at least one of: a preamble format, the number of repetitions of the preamble format, or a repetition type of the preamble format.

The sending unit corresponds to a sending antenna, and the base station may further include a processor that may be used to form knowledge information.

In an exemplary embodiment, the preamble format is used for indicating a length of a cyclic prefix, the number of repetitions of a preamble sequence, and a length of the preamble sequence.

In summary, the base station may be used for performing the aforementioned signaling sending method.

An embodiment provides a terminal. The terminal includes a seventh receiving unit.

The seventh sending unit is configured to receive indication information of a random access signal from a base station.

The indication information includes at least one of: a preamble format, the number of repetitions of the preamble format, or a repetition type of the preamble format.

The seventh receiving unit corresponds to the receiving antenna in the terminal, and may be configured to perform operations in the signaling receiving method.

In an exemplary embodiment, the preamble format is used for indicating a length of a cyclic prefix, the number of repetitions of a preamble sequence, and a length of the preamble sequence.

Several examples are provided below in conjunction with the above embodiments.

Example 1

The example provides a method for receiving a random access signal. The method includes the steps described below.

The base station determines and notifies the terminal of a signal format of the random access signal.

The signal format here may be the aforementioned first extended signal format or second signal extended format.

The base station receives a random access signal transmitted by the terminal in accordance with a corresponding format.

The received random access signal is formed of a plurality of preambles which are repeated and combined continuously. Repetition of the preamble may be repetition of a preamble without carrying a cyclic prefix or repetition of a preamble carrying a cyclic prefix.

In an example, repetition of the preamble may be repetition of the same preamble sequence or repetition of different preamble sequences.

In an example, a length of the cyclic prefix of the aforementioned extended signal may be equivalent to a length of the cyclic prefix of the basic signal format, or greater than or equal to twice the length of the cyclic prefix of the basic signal format.

In the example, the base station may notify, by signaling, that the random access resource of the random access signal has an association relationship with the sending resource of the downlink signal, and the association relationship is embodied in time correlation in the time dimension or frequency domain association. For example, the time difference between two resources is within preset time, and the frequency difference between the two resources is within a preset frequency range.

In the example, the resource starting point of the combined multiple continuous random access signals received by the base station may have an association relationship with the sending resources of multiple downlink signals. The resources of the multiple continuous random access signals are jointly determined by the resource starting point of the combined multiple continuous random access signals, the relative position between the sending resources of the multiple downlink signals, and the formats of the random access signals. The downlink signal here may be the aforementioned specified downlink signal.

The random access resources for sending the random access signal may be continuous or discontinuous.

The base station receives the random access signal in segments on the discontinuous random access resources, and the length of each segment of the random access signal is not necessarily equal.

The number of segments is notified by the base station to the terminal; or the base station notifies the terminal that a certain segment of the random access signal is delayed to be transmitted on the next available random resource; or the base station notifies the terminal that the random access resource of a certain segment of the random access signal is punctured; or the terminal knows that a certain segment of the resource is occupied by other services to result in segmentation of the random access signal.

Example 2

The example further provides a random access method. The method includes a step described below.

The terminal receives the random access signal format indicated by the base station, and transmits the random access signal in accordance with the corresponding format. The signal format here may be the aforementioned extended signal format such as the first extended signal format or the second extended signal format.

A plurality of preambles are repeated and combined continuously to form the random access signal.

Repetition of the preamble may be repetition of a preamble without carrying a cyclic prefix or repetition of a preamble carrying a cyclic prefix.

The random access signal format may further include at least one of the following parameters: a length of a cyclic prefix, the number of repetitions of a preamble, and a length of combined and repeated preambles.

Repetition of the preamble may be repetition of the same preamble sequence or repetition of different preamble sequences.

The length of the cyclic prefix of the extended signal format is equivalent to the length of the cyclic prefix of the preamble basic signal format, or is twice or multiple times the length of the cyclic prefix of the preamble basic signal format.

The uplink resource of the random access signal has an association relationship with the sending resource of the downlink signal, and the association relationship is a relative time or frequency deviation predefined or notified by signaling.

The resource starting point of the combined multiple continuous random access signals has an association relationship with multiple downlink channels or signals. The resources of the multiple continuous random access signals may be jointly determined by the resource starting point of the combined multiple continuous random access signals, relative position between the multiple downlink signals or signals, and the formats of the random access signals.

The resource used for transmitted the random access signal may be continuous or discontinuous.

On the discontinuous resources, the random access signal is transmitted in segments, and the length of each segment of the random access signal is not necessarily equal. The preamble in the segmented random access signal needs to have a cyclic prefix.

The terminal receives the number of segments notified by the base station; or the terminal receives signaling, notified by the base station, that a certain segment of the random access signal is delayed to be transmitted on the next available random resource; or the terminal receives signaling, notified by the base station, that the random access resource of a certain segment of the random access signal is punctured; or the terminal knows that a certain segment of the resource is occupied by other services to result in segmentation of the random access signal.

Example 3

Figure 13:
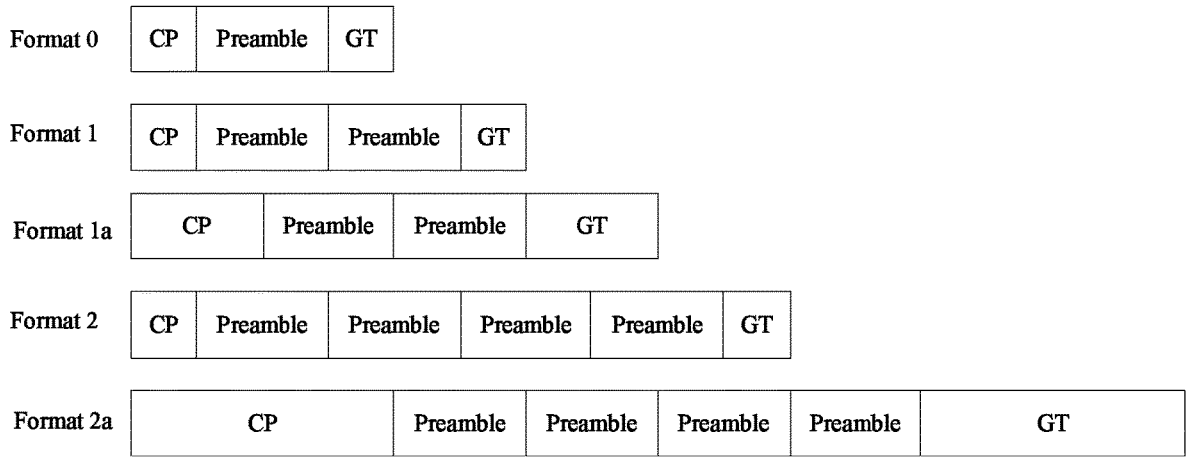
FIGS. 13 and 14 are schematic diagrams illustrating formats of a random access signal according to an embodiment of the present disclosure.

As shown in FIG. 13, five types of signal formats of the random access signal are provided. A format 0 is a basic signal format. No preamble is repeated, and a cyclic prefix (CP) is also used for regular coverage. GT in FIG. 13 represents guard interval and is an abbreviation of guard time. The other four formats are extended signal formats in which the preamble of the basic format is repeated for multiple times, and the repeated preambles are the same. The difference is that the length of the cyclic prefix of the format 1 and the length of the cyclic prefix of the format 2 are equivalent to the length of the cyclic prefix of the basic format. Being equivalent may be understood as being equal or not being significantly different in magnitude, such as a difference value of less than 20%. This means that formats 1 and 2 are equivalent to the basic format 0 in the coverage distance. The repeated preamble is only used to adapt the number of receiving beams of the base station. If the preamble is repeated for two times, two opportunities of beam reception are provided to the base station. If the preamble is repeated for three times, three opportunities of beam reception are provided to the base station. Formats 1a and 2a each have both a repetition of the preamble and a significantly longer cyclic prefix relative to the basic format. This means that formats 1a and 2a each can be used both for providing the base station with multiple opportunities for receiving the beams and for covering a larger distance. Coverage of a larger distance may be guaranteed by a longer preamble sequence and cyclic prefix. The long preamble formed by the repetition of multiple preambles can provide a cumulative amount of energy to satisfy larger coverage. A design for the signal format of the random access signal is not limited to the five types provided in FIG. 13. The corresponding design criteria are summarized as follows. The preamble of the basic format is repeated for multiple times without cyclic prefix, and the repeated preambles are the same. Cyclic prefixes of different lengths are added to a repeated long preamble, and the length of the cyclic prefix of a certain format is equivalent to the length of the cyclic prefix of the basic format. The length of the cyclic prefix of the certain format is twice or multiple times the length of the cyclic prefix of the basic format and is very likely to be an integer multiple of the length of the cyclic prefix of the basic format.

The number of repetitions of the preamble in the signal format of the random access signal may be set based on the number of times the base station receives the beam in time division. For example, the base station has eight receiving beams for an initial access. The eight beams are all analog beams and may alternate in time division, so the number of times using receiving beams in time division is 8. If eight beams are mixed beams and four digital beams may be received at the same time, the number of times using receiving beams in time division is 2. This capability is implicitly notified to the terminal through a selection of the random access preamble format.

The extended signal format in the example may be equivalent to the first extended signal format described in the foregoing example.

Example 4

The example provides another random access method. The general operation is similar to the operation in the example 3, and the biggest difference is that the preamble is repeated with the cyclic prefix. This repetition mode may be applied to the design requirements that the terminal switches the transmit beam or different preambles are for different terminals.

Figure 14:
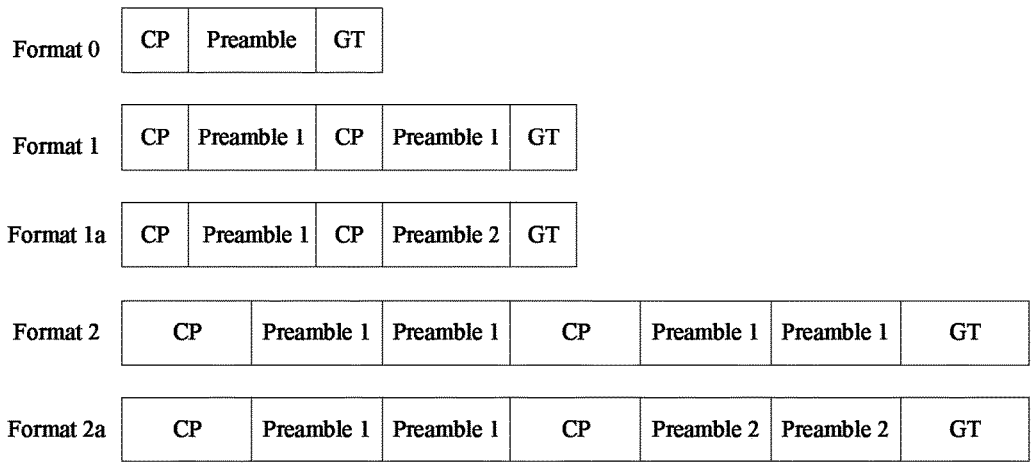

As shown in FIG. 14, a signal format 0 is a basic signal format. A format 1 is an extended signal format. Two preambles of the format 1 are respectively used for different transmit beams of the same terminal, so actually it is the length of the preambles that determines the coverage distance, that is, the coverage distance of the format 1 is equivalent to the coverage distance of the basic format, and the length of the cyclic prefixes is also equivalent to the length of the cyclic prefix of the basic format. A format 1a is also an extended signal format. In the format 1a, the preamble includes a preamble 1 and a preamble 2. The preambles in the format 1 are both the preamble 1. Therefore, the format 1a is the same as the format 1 except that different preamble sequences are used on the two preambles. Different preambles may be applied to different terminals. The format 2 and the format 2a each are the extended signal format having outer loop repetitions that are delimited by a cyclic prefix and have the same purpose as the format 1 and the format 1a in which the outer loop repetition of the extended signal format is delimited by the cyclic prefix. The inner loop preamble in the same cyclic prefix is repeated, and the purpose is similar to the example 3, which can be applied to a more distant coverage scenario, and can also be used to provide more opportunities for the base station to receiving beams. The format 2 and the format 2a may be considered as a mixture of the example 1 and this example with the cyclic prefix not repeated. The format 2 and the format 2a are different in that the long preambles, repeated in the outer loop, of the format 2a are different, and may be applied to different terminals. All preambles in the format 2 are the preamble 1. Preambles included in the format 2a include the preamble 1 and the preamble 2. GT at the end of each signal format is not defined, while the function of the GT cannot be ignored.

The GT is used to protect the normal orthogonal frequency division multiplexing (OFDM) symbols from interference after the random access. The function of the GT may be replaced by a cyclic prefix, so no GT exists between multiple repeated preambles.

The format design of the preamble in the embodiment is not limited to the five types provided in FIG. 14, and the corresponding design criteria are summarized as follows: the preamble of the basic format is repeated with a cyclic prefix for multiple times, and the repeated preambles may be the same or different. The long preamble that is repeated with the cyclic prefix may further be repeated with the cyclic prefix for multiple times.

The extended signal format in the example may be the second extended signal format described in the foregoing example.

Example 5

In the random access process, determination of the uplink resource selected for the random access signal is a very important issue. In the example 3 and the example 4, different random access preamble formats are provided. Since different time lengths are occupied by the corresponding formats, the random access preamble format affects the selection and determination of the uplink resource.

The example provides a method for determining an uplink resource selected for a random access signal. The uplink resource for the uplink random access signal may be determined based on a relevant downlink signal, such as a synchronization signal and a signal at time and frequency positions of a broadcast channel, used in the initial access process and by using a set relative deviation or a relative deviation notified by signaling. The advantage of determining the uplink random access signal resource by uniqueness is that the base station may identify the optimized base station downlink signal selected by the terminal, such as an optimal downlink synchronization signal, from a position of the uplink random access signal. If the base station has channel reciprocity, the base station may not only identify the optimized downlink transmit signal of the base station from the position of the uplink random access signal, but also determine an optimized uplink receiving signal of the base station.

Figure 15:
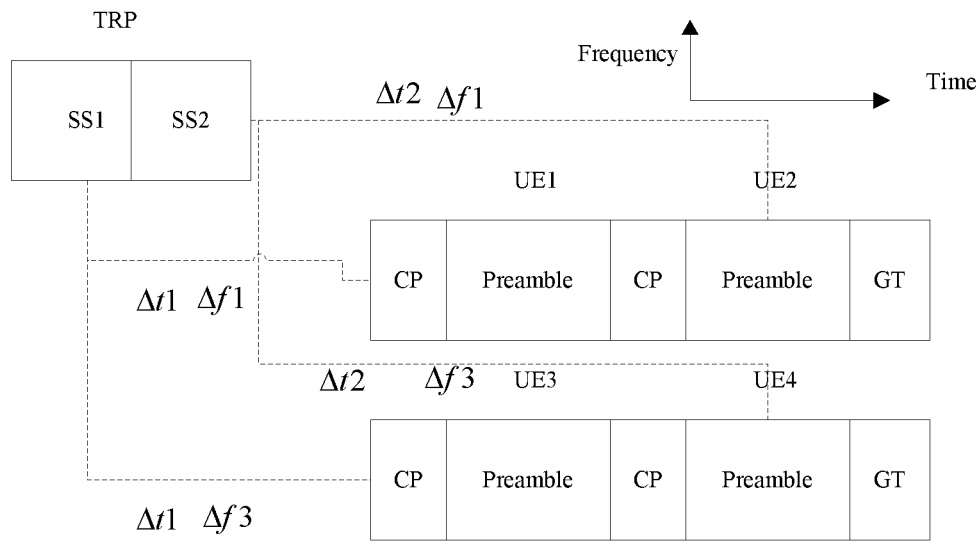
FIGS. 15 to 17 are schematic diagrams illustrating association between a sending resource of a downlink signal and a random access resource according to an embodiment of the present disclosure.

As shown in FIG. 15, a transmit receive point (TRP) is a wireless transmission node of the base station, an SS1 and an SS2 are two different synchronization signals in sequence. The random access resources determined by a UE1 and a UE3 are related to the SS1 and are mapped by the position of the SS1. The relative time difference between the UE1 and the SS1 is $\Delta t1$, the relative time difference between the UE3 and the SS1 is $\Delta t1$ the relative frequency difference between the UE1 and the SS1 is $\Delta f1$, and the relative frequency difference between the UE3 and the SS1 is $\Delta f3$ The random access resources determined by a UE2 and a UE4 are related to the SS2 and are mapped by the position of the SS2. The relative time difference between the UE2 and the SS2 is $\Delta t2$ the relative time difference between the UE4 and the SS2 is $\Delta t2$ the relative frequency difference between the UE2 and the SS1 is $\Delta f1$, and the relative frequency difference between the UE4 and the SS2 is $\Delta f3$.

If the resources occupied by different random access preambles are continuous, the resources may be physical resources or logical resources continuous in the time domain or the frequency domain.

As shown in FIG. 3, the resources used by the UE1 and the UE3, the UE2, and the UE4 are continuous in the time domain, and the relative positions of resources occupied by different random access preambles may be determined by a sequence of mapping the downlink channels or signals.

The UEs each only need to know the starting position of the random access resource; the relative sequence in the random access resource may be mapped one by one through a relative sequence of respective correspondence of each UE with the synchronization signal (SS) such as the synchronization signals SS1 and SS2. Then the random access signal resource of each UE may be uniquely determined in combination with the format of the random access signal. This way of implicitly determining a resource by the relative sequence may effectively save signaling indicated by the base station to the terminal.

In summary, the uplink resource selected for the random access signal has an association relationship with the downlink resource of the downlink signal, and the association relationship is a relative time or frequency deviation predefined or notified by signaling. When multiple continuous random access signals exist, the resource starting point of the combined multiple continuous random access signals has an association relationship with multiple downlink channels or signals.

The respective resources of the multiple continuous random access signals may be determined by a combination of the resource starting point of the combined multiple continuous random access signals, relative position between multiple downlink channels or signals and the formats of the random access signals.

Example 6

The difference exists in the maximum transmit power between the base station and the terminal, so in order to achieve equivalent coverage between the downlink synchronization and the uplink random access, the resource overhead of the random access, especially the duration occupied by the random access is much larger than the resource overhead of the downlink synchronization signal.

For example, in the long term evolution (LTE) system, only one primary synchronization signal symbol exists within 5 ms, and the resource occupied by the random access signal is not less than 14 symbols. The new generation mobile communication system has shorter subframe and slot length than the LTE, so when coverage of a larger distance is to be satisfied, the resource occupied by the random access signal may exceed the length of the random access slot or subframe.

In the new generation mobile communication system, the time division duplex (TDD) mode is more inclined to be used. Both downlink and uplink exist in one slot or subframe, and the transmission slot may have 7 or 14 symbols. Due to service asymmetry, less symbols are used for uplink transmission, and continuous uplink transmission symbols may not fully accommodate the random access signal.

Since the random access signal may be of a relatively long length, the uplink resources of other terminals when service data is sent are interrupted for a long time, and the interruption time of normal service data of other terminals need to be reduced.

For the many reasons described above, random access signals are required to support discontinuous transmission. FIG. 4 shows an example of discontinuous transmission. The random access signal transmitted continuously in FIG. 14 is segmented and transmitted on discontinuous resources in FIG. 15.

Figure 16:
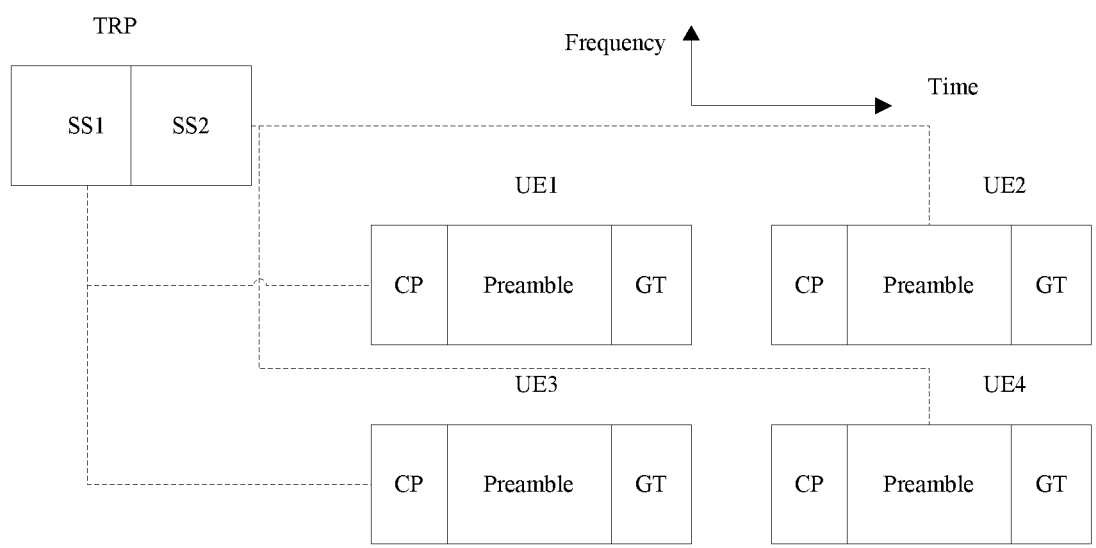

Exemplarily, FIG. 15 is formed by segmenting continuous resources in FIG. 14. The segmentation may be performed through an explicit segmentation indication on the signaling, and the base station instructs the terminal to perform reasonable segmentation according to the resource state. The segmentation indication may be the number of segments of the resource segmentation or the length of the preamble in each segment. This also means that the lengths of the preambles of different segments may be allowed to be different. After segmentation, GT may be formed behind the preamble to protect normal symbols behind the preamble. If the repeated preamble does not have a cyclic prefix before segmentation, a cyclic prefix may also be added. As shown in FIG. 16, before segmentation, multiple segments of preambles belong to the same terminal, and no cyclic prefix exists; and after segmentation, a cyclic prefix may be added to the preamble.

Figure 17:
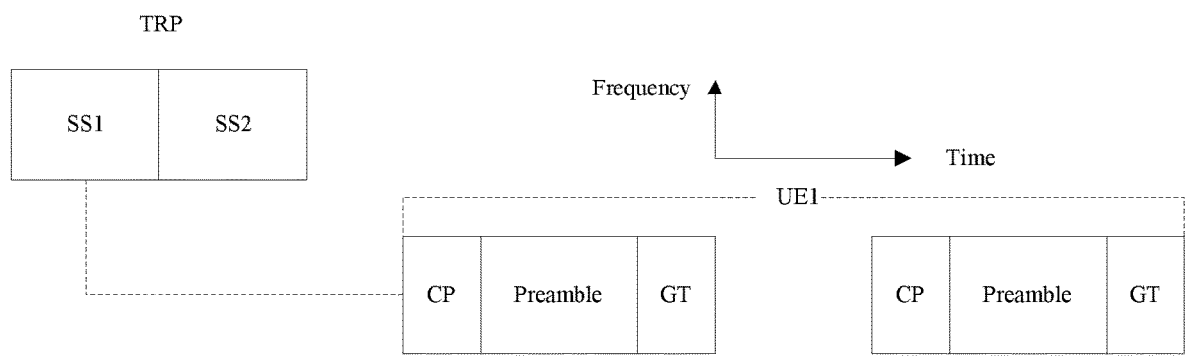

Another exemplary method is to puncture continuous random access resources to conduct discontinuous random access transmissions. For the TDD mode, the downlink resource in the time slot may be regarded as a punctured uplink resource. After puncturing, the random access signal at the original puncturing position is delayed to the next available random access resource for transmission. As shown in FIG. 17, the position of the second preamble is punctured, and the corresponding transmission is delayed to the next available preamble resource, or this part of punctured resources is ignored and not used. After puncturing, GT is naturally formed behind the first preamble, and the cyclic prefix may be added to the second preamble. The purpose of puncturing may be achieved by notifying the terminal to delay the signaling of the random access signal transmission. A very important reason for puncturing is that the corresponding random access resource is preempted by a service of a higher priority.

An embodiment of the present disclosure further provides a computer storage medium, which is configured to store executable instructions. The computer or the processor may implement at least one of the foregoing method for determining a receiving configuration of an uplink beam and the method for requesting an uplink random access by executing the executable instructions. The computer storage medium may be a non-transitory storage medium.

It should be understood by those skilled in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be implemented jointly by several physical components.

Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are only exemplary embodiments of the present disclosure and are not intended to limit the protection scope of the present disclosure. Those skilled in the art can easily conceive modifications or substitutions within the technical scope of the present disclosure. These modifications or substitutions should fall within the scope of the present disclosure. Therefore, the protection scope of the present disclosure is subject to the protection scope of the claims.

INDUSTRIAL APPLICABILITY

The embodiments of the present disclosure provide a method and device for determining an uplink receiving beam, a random access method and device, base station and terminal. In a first aspect, the base station may receive a random access signal by using multiple receiving configurations, thereby obtaining multiple pieces of receiving state information, and then selects a receiving configuration of the downlink receiving beam according to the receiving state information, so that the terminal does not send multiple random access signals, thereby reducing the power consumption of sending the random access signal by the terminal and reducing the communication resources occupied by the random access signal sent for multiple times. In a second aspect, the terminal sends a random access signal by simultaneously using multiple sending parameters, and the base station naturally receives the random access signal sent by using each sending parameter, so that the receiving configuration of the downlink receiving beam may also be determined according to the receiving state information of the random access signal. In a third aspect, the terminal first receives the specified downlink signal, and according to the receiving state information of the specified downlink signal, selects a corresponding random access resource, and send the corresponding random access resource to the base station. Then the base station may determine the receiving configuration of the uplink receiving beam according to a corresponding relationship among receiving time of the random access signal, the random access resource of the random access signal and the sending resource of the specified downlink signal. In this way, the terminal also only needs to send a random access signal. In summary, the number of random access signals sent by the terminal is reduced, thereby reducing the signaling overhead of the random access signal, the power consumption of the terminal, and the occupied communication resources. Therefore, the present disclosure has industrial applicability.

What is claimed is:

1. A method, comprising:
receiving, by a wireless communication node from a wireless communication device, a random access signal by using a number N of receiving configurations, wherein the number N is an integer equal to or greater than 2;
obtaining, by the wireless communication node, respective receiving state information corresponding to the number N of receiving configurations; and
determining, by the wireless communication node, the receiving configuration of an uplink receiving signal according to the receiving state information.

2. The method of claim 1, wherein receiving the random access signal comprises:
receiving, by the wireless communication node from the wireless communication device, a plurality of segments of the random access signal, wherein each of the plurality of segments of the random access signal is received by adjusting to a respective one of the number N of receiving configurations.

3. The method of claim 2, comprising:
sending, by the wireless communication node to the wireless communication device, a segment indication indicating at least one of: transmission of the random access signal in the plurality of segments, a number of the plurality of segments, or a segmentation interval,
wherein the wireless communication device sends the plurality of segments of the random access signal to the wireless communication node according to the segment indication.

4. The method of claim 1, wherein the number N of receiving configurations are used simultaneously to receive the random access signal.

5. The method of claim 1, wherein receiving the random access signal comprises:
obtaining, by the wireless communication node from the wireless communication device, a plurality of segments of receiving state information;
selecting, by the wireless communication node, a receiving configuration of the number N of receiving configurations according to a comparison of the segments of receiving state information.

6. The method of claim 1, wherein receiving the random access signal comprises:
obtaining, by the wireless communication node from the wireless communication device, a plurality of segments of receiving state information;
selecting, by the wireless communication node, a receiving configuration of the number N of receiving configurations according to a comparison between the segments of receiving state information and a preset threshold.

7. The method of claim 1, wherein before receiving the random access signal, the method comprises:
sending, by the wireless communication node to the wireless communication device, a signal format for use by the wireless communication device to send the random access signal.

8. The method of claim 1, wherein the received random access signal is associated with a first signal format, and an existing random access signal is associated with a second signal format.

9. The method of claim 8, wherein the first signal format includes a first cyclic prefix and a first preamble, wherein the second signal format includes a second cyclic prefix and a second preamble, wherein a first length of the first cyclic prefix is equal to a second length of the second cyclic prefix.

10. The method of claim 8, wherein the first signal format includes a first cyclic prefix and a first preamble, wherein the second signal format includes a second cyclic prefix and a second preamble, wherein a first length of the first cyclic prefix is within a predetermined range of a second length of the second cyclic prefix.

11. The method of claim 8, wherein the first signal format includes a first cyclic prefix and a first preamble, wherein the second signal format includes a second cyclic prefix and a second preamble, wherein a first length of the first cyclic prefix is greater than or equal to a number M times a second length of the second cyclic prefix, wherein the number M is equal to the number N.

12. The method of claim 8, wherein the second signal format corresponds to an orthogonal frequency division multiplexing (OFDM) symbol.

13. A wireless communication node, comprising:
at least one processor configured to:
receive, via a transceiver from a wireless communication device, a random access signal by using a number N of receiving configurations, wherein the number N is an integer equal to or greater than 2;
obtain respective receiving state information corresponding to the number N of receiving configurations; and
determine the receiving configuration of an uplink receiving signal according to the receiving state information.

14. The wireless communication node of claim 13, wherein the at least one processor is configured to receive the random access signal by:
receiving, via the transceiver from the wireless communication device, a plurality of segments of the random access signal, wherein each of the plurality of segments of the random access signal is received by adjusting to a respective one of the number N of receiving configurations.

15. The wireless communication node of claim 14, wherein the at least one processor is configured to:
send, via the transceiver to the wireless communication device, a segment indication indicating at least one of: transmission of the random access signal in the plurality of segments, a number of the plurality of segments, or a segmentation interval,
wherein the wireless communication device sends the plurality of segments of the random access signal to the wireless communication node according to the segment indication.

16. The wireless communication node of claim 13, wherein the number N of receiving configurations are used simultaneously to receive the random access signal.

17. The wireless communication node of claim 13, wherein the at least one processor is configured to receive the random access signal by:
obtaining, from the wireless communication device, a plurality of segments of receiving state information;
selecting a receiving configuration of the number N of receiving configurations according to a comparison of the segments of receiving state information.

18. The wireless communication node of claim 13, wherein the at least one processor is configured to receive the random access signal by:
obtaining, from the wireless communication device, a plurality of segments of receiving state information;

selecting a receiving configuration of the number N of receiving configurations according to a comparison between the segments of receiving state information and a preset threshold.

19. The wireless communication node of claim 13, wherein before receiving the random access signal, the at least one processor is configured to:

send, via the transceiver to the wireless communication device, a signal format for use by the wireless communication device to send the random access signal.

20. The wireless communication node of claim 13, wherein the received random access signal is associated with a first signal format, and an existing random access signal is associated with a second signal format.

* * * * *